United States Patent

[11] 3,607,917

[72] Inventor  Vernon W. Buls
               Alamo, Calif.
[21] Appl. No. 803,102
[22] Filed     Feb. 27, 1969
[45] Patented  Sept. 21, 1971
[73] Assignee  Shell Oil Company
               New York, N.Y.

[54] PHTHALATE SALT HYDROGENATION
     6 Claims, No Drawings
[52] U.S. Cl. .................................................. 260/514 R
[51] Int. Cl. ................................................ C07c 51/36
[50] Field of Search .......................................... 260/514

[56]            References Cited
          UNITED STATES PATENTS
2,070,770  2/1937  Amend ......................... 260/99.40
2,828,335  3/1958  Ferstandig et al. ............ 260/514

Primary Examiner—Lewis Gotts
Assistant Examiner—Robert Gerst
Attorneys—J. H. Colvin and E. Walter Makr ABSTRACT: Salts of phthalic acids are hydrogenated to hexahydrophthalic acid salts at temperatures below 150° C. by liquid-phase contact with hydrogen in the presence of Raney nickel when excess alkali is present.

PHTHALATE SALT HYDROGENATION

BACKGROUND OF THE INVENTION

This invention relates to a method for hydrogenating salts of phthalic acids to produce the corresponding salts of hexahydrophthalic acid. The salts can be employed in the preparation of polymers for use in plastics and the like and represent a valuable source of hexahydrophthalic acid by acidification of the salt to liberate the hexahydrophthalic acid in accordance with methods familiar to those skilled in the art. Hexahydrophthalic acids can be used in the manufacture of polymers, such as epoxides, polyesters, and alkyd resins.

Known methods for hydrogenation of salts of phthalic acids have inherent disadvantages. U.S. Pat. No. 1,877,991 issued Sept. 20, 1932 to Schwenk et al. describes the hydrogenation of salts of phthalic acids using as heterogeneous catalyst supported nickel. The process of this patent is effective for the hydrogenation of the phthalic acid aromatic ring only at high temperatures (150°-250° C.). At these high temperatures substantial decarboxylation occurs resulting in impractically low yields of hexahydrophthalic acid salts and in purification problems.

As pointed out in Example 2 of U.S. Pat. No. 2,828,335 issued Mar. 25, 1958 to Ferstandig et al., at temperatures below about 150° C, economically attractive nickel catalysts, including Raney nickel sponge, are not effective catalysts for hydrogenation of phthalic acid salts. Ferstandig et al. describe a hydrogenation process effective at temperatures below 150° C. This process however requires highly expensive catalysts of ruthenium metal and ruthenium compounds. Clearly, a process for the hydrogenation of phthalic acid salts, effective below 150° C. which utilizes inexpensive nickel catalysts would be preferable.

STATEMENT OF THE INVENTION

It has now been discovered that salt of phthalic acids are effectively hydrogenated to hexahydrophthalic acid salts at temperatures below about 150° C. by intimate contact as a dispersion in liquid phase with a hydrogen-containing gas in the presence of a catalyst comprising Raney nickel when alkali is present in amount in excess of that required to form the phthalic acid salts from phthalic acids. It has been further discovered that the rate of this hydrogenation of phthalic acid salts may be increased when an aqueous medium is used by admixing a minor proportion of lower alkanol with the aqueous salt solution prior to hydrogenation. The salts may be recovered from solution following hydrogenation and purified and, if desired, converted to the corresponding hexahydrophthalic acids.

DESCRIPTION OF PREFERRED EMBODIMENTS

According to the process of this invention, salts of phthalic acids may be hydrogenated, using as a catalyst Raney nickel, when alkali is present. The phthalic acid salts and the alkali are dispersed in a liquid medium. By "phthalic acids" is meant the three isomeric benzene dicarboxylic acids, i.e., the ortho-, meta- and para-isomers. The singular, "phthalic acid," conventionally is the ortho-isomer.

Phthalate salts suitable as feed materials comprise generally the alkali metal salts of phthalic acid, isophthalic acid, and terephthalic acid. Preferred among these salts are the sodium and potassium salts with the potassium salt of phthalic acid being especially preferred. These salts may be dispersed as such in the liquid medium, or in the alternative may be formed in situ by admixing alkali metal hydroxides with phthalic acids or by admixing with the liquid medium and alkali metal hydroxide a material such as phthalic anhydride or ammonium phthalate which upon reaction with the liquid medium and/or alkali metal hydroxide yields an alkali metal phthalate.

Whether the phthalate salts are added to the medium as such or generated therein it is essential, according to the process of this invention, to add excess alkali. Suitable alkalies comprise the alkali metal hydroxides. Preferred alkalies comprise sodium and potassium hydroxide, with potassium hydroxide being most preferred. The amount of alkali added can vary widely. The amount of alkali added has an effect on the rate of hydrogenation, the rate of hydrogenation increasing as the pH of the reaction mixture is increased. Generally suitable are pH's of at least 12 with pH's of at least 13.5 being preferred, and pH's of at least 14.5 being especially preferred, all pH's measured on the concentrated reaction mixture. Generally an addition of excess alkali equivalent to at least about 0.001 times the stoichiometric amount of phthalate salt present is suitable. Preferred are alkali additions equivalent to from 0.01 to 0.50 times the stoichiometric amount of phthalate salt present with additions equivalent to from 0.05 to 0.25 times the stoichiometric amount of phthalate salt being most preferred.

The phthalate salt is hydrogenated dispersed in a liquid medium. In forming the dispersion of the feed materials, including true solutions, suspensions and the like, a polar, preferable hydroxylic, nonaqueous medium may be used, such as a lower alkanol, including polyols, or the like, an essentially aqueous medium being preferred because of its low cost, its essentially inert nature toward the phthalate solute, the Raney nickel comprising catalyst, and hydrogen gas and its ability to contain appreciable concentrations of salts. True solutions of phthalate salts of concentration such that the dispersion of products which result following hydrogenation are true solutions are preferred because of ease of separation of Raney nickel catalyst therefrom.

Especially preferred media comprise a major proportion of water and a minor proportion of lower alkanol. Suitable lower alkanols comprise those having from isopropanol to about 6 carbon atoms such as for example ethanol, propanol, butanol, hexanol, isopropanol, secondary butanol, tert-butanol, isobutanol, sec-amyl alcohol, isoamyl alcohol, ethylene glycol and propylene glycol.

Preferred lower alkanols comprise the lower secondary alkanols of from 2 to about 5 carbon atoms, such as for example isoprapanol, sec-butanol and sec-amyl alcohol. Most preferred alkanols are isopropanol and sec-butanol.

The proportion of lower alkanol in the reaction medium can vary widely. Generally suitable reaction media contain from about 0.5 percent to about 10 percent weight alkanol. Preferred media contain from about 1 percent to about 5 percent alkanol while especially preferred media contain from about 1.5 to about 4 percent alkanol. Addition of larger proportions of alkanol to water medium generally decreases the solubility of the phthalate salts. Although its function is not understood with certainty, the added alkanol increases the rate of hydrogenation.

As hydrogenation catalyst, commercial Raney nickel is used. The amount of catalyst employed may vary over a considerable range. In general, the amount of catalyst will vary from 1 to 50 percent of the weight of the phthalate salt. Preferred amounts of catalyst range from about 5 to 25 percent of the weight of the phthalate salt.

The catalyst is usually added to the liquid dispersion of the salt and alkali and suspended therein by agitation. The usual procedure is to place the phthalate salt, alkali, liquid medium and catalyst in a suitable reaction vessel, to sweep out the atmospheric gases with hydrogen and subsequently force hydrogen from a continuous source into the vessel under pressure. Relatively low pressures, e.g., 300–500 p.s.i.g. of hydrogen, are generally effective. Higher pressures, e.g., 500 to 3000 pounds, are correspondingly more effective and generally are the more preferred. Particularly preferred pressures range from 500 to 2000 p.s.i.g. When the vessel is not continuously connected with a source of hydrogen under pressure, it may be desirable to make one or more additions of hydrogen during the reaction.

The temperature employed in the hydrogenation should be from about 90° to about 150° C. Lower temperatures cause very slow reaction, higher temperatures lead to short catalyst life and poor yields. It has been found that the lower the temperature is maintained the greater the proportion of the cis stereoisomer of the hexahydrophthalate product. The cis form is potentially more desirable as it may be converted into the acid anhydride, useful as curing agent for various epoxy resin systems, as is well known. Hydrogenation temperatures from 100° to 130° C. are preferred as they produce in high yield a hydrogenated product having a major cis isomer content in a relatively short reaction time.

Following hydrogenation, the catalyst and other solid material which may be present may be separated by filtering or centrifuging the reaction mixture. The hexahydrophthalate salt formed in the hydrogenation process may, if desired, be converted to hexahydrophthalic acid while the salt is still in the reaction mixture or after it has been separated by any of the conventional means, such as by treating the salt with an acid such as hydrochloric acid.

The apparatus employed in the hydrogenation process may be of any construction or design as long as it provides means for maintaining the proper temperature. The conventional autoclave constructed from materials resistant to alkali embrittlement has proved very satisfactory for this process. The process may be conducted in a batchwise, semicontinuous or continuous manner.

To illustrate the manner in which the invention may be carried out, and the advantages thereof, the following examples are given.

EXAMPLE I

An aqueous solution of potassium phthalate was prepared by dissolving 2.55 gram-moles of phthalic anhydride and 5.02 gram-moles of potassium hydroxide (mole ratio $OH^1/H^+ = 0.984$) in about 375 grams of water and 60 grams of isopropanol. The solution had a pH of 8.5. About 125 grams of Raney nickel was then added and the resulting mixture exposed with stirring to 500 p.s.i.g. hydrogen pressure at a temperature of 115° C. The rate of hydrogenation was too slow to be measured by hydrogen uptake.

EXAMPLE II

A series of aqueous solutions of potassium phthalate were prepared and hydrogenated using essentially the concentrations, conditions, and procedures of Example I. Minor changes were made in the amounts of phthalic anhydride and potassium hydroxide used in the solutions. First order rate constants for the phthalate hydrogenation reaction were calculated from measured rates of hydrogen consumption. These rate constants, the molar ratio of $OH^1$ to $H^+$ and the pH of the solutions are shown in Table 1.

TABLE 1.—EFFECT OF EXCESS CAUSTIC ON HYDROGENATION REACTION RATE

| Solution | Molar ratio, $OH^-/H^+$ | pH of solution | First order rate constant, hrs.$^{-1}$ |
|---|---|---|---|
| A | 0.99 | 10.7 | .062 |
| B | 1.00 | 12.0 | .11 |
| C | 1.10 | 14.9 | .49 |

EXAMPLE III

Two aqueous solutions of potassium phthalate having excess potassium hydroxide were prepared by dissolving 2.0 gram-mole portions of phthalic anhydride and 4.1 gram-mole portions of potassium hydroxide in about 260 grams of water. The solutions had pH's of 14.4 and 14.6. To each solution was added Raney nickel and the resulting mixtures were exposed with stirring to 2,000 p.s.i.g. and 3,700 p.s.i.g., respectively, hydrogen pressure at temperatures of about 185° and about 104° C. respectively. At the high temperature, initially there was hydrogenation but the catalyst rapidly lost activity. Yield of hexahydrophthalate salt was low. At the low temperature, as expected, the reaction rate was very slow. Analysis of the products of the two hydrogenations showed the high temperature-produced hexahydrophthalate to be 64 percent desirable cis isomer while the low temperature-produced material was 94 percent cis isomer. Hexahydrophthalate produced in Example II at 115° C. was about 90 percent cis isomer.

EXAMPLE IV

A series of aqueous solutions of potassium phthalate were prepared having a constant excess of potassium hydroxide (mole ratio $OH^1/H^+ = 1.1$). To these solutions were added varying proportions of is propanol. These solutions were then hydrogenated using the conditions and procedures of Example I. As shown in Table 2, there are definite limitations on the amount of alkanol used.

TABLE 2.

EFFECT OF AMOUNT OF ALKANOL

ON HYDROGENATION RATE

| Solution | % Wt. Isopropanol | First Order Rate Constant, Hrs.$^{11}$ |
|---|---|---|
| D | 1 | 0.36 |
| C | 2.3 | 0.49 |
| E | 4.6 | 0.36 |

In solution E phthalate salt precipitation was noted at room temperature. Thus, while alkanol addition appears to be beneficial to reaction rate, excessive amounts can decrease reaction rate by causing precipitation of reactants and blending of the catalyst with precipitated salt.

EXAMPLE V

A series of aqueous solutions of potassium phthalate were prepared having a constant excess of potassium hydroxide (mole ratio $OH^1/H^{115}=1.1$). To these solutions were added about 2.3 percent weight of several lower alkanols. These solutions were hydrogenated using the method of Example I. The hydrogenation rate constants observed are shown in Table 3.

TABLE 3.

EFFECT OF LOWER ALKANOLS

ON HYDROGENATION RATE

| Solution | Alkanol | First Order Rate Constant, Hrs.$^{11}$ |
|---|---|---|
| F | Methanol | no reaction |
| G | Ethanol | 0.31 |
| C | Isopropanol | 0.49 |
| H | Sec-butanol | 0.43 |
| I | Tert-butanol | 0.34 |

EXAMPLE VI

An aqueous solution of sodium phthalate containing an excess of sodium hydroxide was prepared and hydrogenated using the procedure of Example I. The less soluble sodium phthalate required a more dilute starting solution. The hydrogenation was slowed by precipitation of the sparingly soluble hexahydrophthalate salt blinding the Raney nickel particles. Sodium hexahydrophthalate solubility was found to decrease with increased temperature.

I claim as my invention:

1. A process of preparing alkali metal hexahydrophthalates by intimately contacting a dispersion of an alkali phthalate and a small stoichiometric excess of alkali metal base in an aqueous medium selected from water and water containing from 0.5 percent to 10 percent by weight of lower alkanol of from 2 to 6 carbon atoms, with a hydrogen-containing gas at a hydrogen pressure of from 500 to 3000 p.s.i.g. and at a temperature below 150° C. in the presence of Raney nickel catalyst.

2. A process in accordance with claim 1 wherein alkali metal base is present in amount such that the pH of the dispersion is at least 13.5 and the temperature is in the range of from 100° to 130° C.

3. A process in accordance with claim 2 wherein the dispersion of phthalate and alkali metal base is a water solution.

4. A process in accordance with claim 2 wherein the aqueous medium is water containing from about 1 to about 5 percent by weight of a lower secondary alkanol of from 2 to 5 carbon atoms.

5. A process in accordance with claim 4 wherein the temperature is from 100° to 130° C. and the pressure of hydrogen is from 500 to 2000 p.s.i.g.

6. A process in accordance with claim 5 wherein the phthalate is potassium phthalate and the alkali metal base is potassium hydroxide.